July 16, 1968
H. L. REINSMA ET AL
3,392,984
COMPACT METAL FACE SEAL FOR A SEALED TRACK
Filed March 29, 1965
3 Sheets-Sheet 1
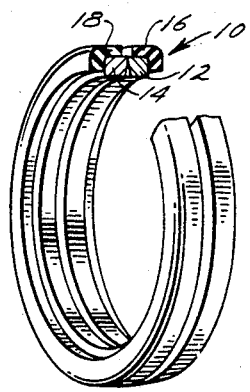
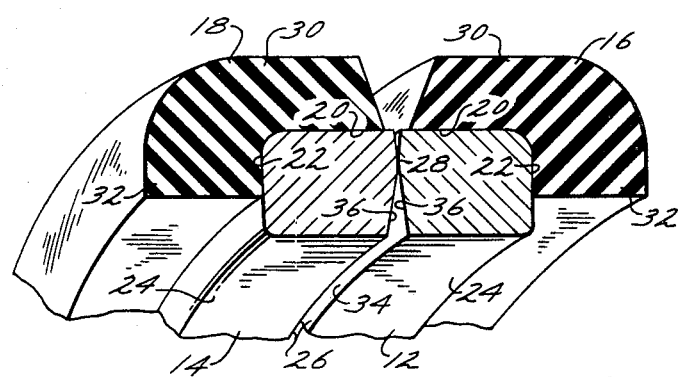
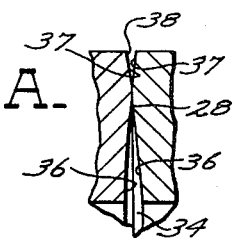
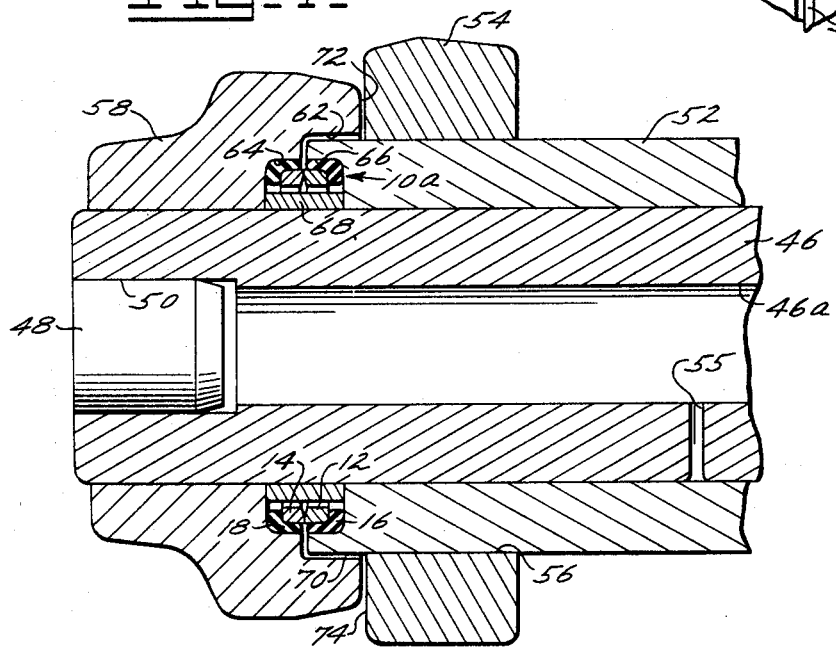
INVENTORS
HAROLD L. REINSMA
EUGENE J. HNILICKA
BY
Fryer, Tjensvold, Feix & Phillips
ATTORNEYS July 16, 1968

H. L. REINSMA ET AL 3,392,984

COMPACT METAL FACE SEAL FOR A SEALED TRACK

Filed March 29, 1965

INVENTORS
HAROLD L. REINSMA
EUGENE J. HNILICKA
BY

ATTORNEYS

July 16, 1968  H. L. REINSMA ETAL  3,392,984
COMPACT METAL FACE SEAL FOR A SEALED TRACK
Filed March 29, 1965  3 Sheets-Sheet 3

INVENTORS
HAROLD L. REINSMA
EUGENE J. HNILICKA
BY
*Fryer, Zimmerwald, Feix & Phillips*
ATTORNEYS United States Patent Office 3,392,984
Patented July 16, 1968

3,392,984
COMPACT METAL FACE SEAL FOR A SEALED TRACK
Harold L. Reinsma and Eugene J. Hnilicka, Peoria, Ill., assignors to Caterpillar Tractor Co., Peoria, Ill., a corporation of California
Filed Mar. 29, 1965, Ser. No. 443,312
5 Claims. (Cl. 277—92)

ABSTRACT OF THE DISCLOSURE

A face seal having two metal rings formed with seal bands at the apexes of oppositely tapered surfaces formed on the inner faces of the rings. Each seal ring has a rectangular cross-section which resists flexure of the seal band from the seal plane when the rings are installed in a seal assembly. L-shaped elastomeric load rings are disposed on outside corners of the seal rings to position the seal rings and to cushion the rings against distortion while pressing the seal bands in fluid contact.

Figure 3:
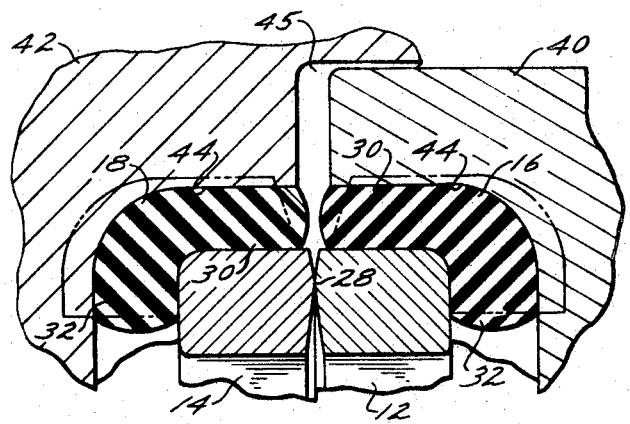

This invention relates to improvements in face seals and more particularly to track-link seals for a sealed track.

The sealing device of the present invention comprises a rigid annular seal ring, preferably made of metal, which is substantially rectangular in radial cross section. Sealing is achieved by shaping one of the annular, radial faces of the ring to define a relatively narrow and circumferentially continuous seal band adapted to be held in engagement under pressure with a similarly formed ring. The seal ring is seated within a rubber annular load ring which is L-shaped in cross section. The L-shaped load ring provides circumferential and radial legs overlying both the outer circumferential surface and that radial face of the seal ring not formed with the seal band. When the seal rings and the associated L-shaped load rings are in use, the radially extending legs of the load rings are compressed to press the seal bands in fluid sealing contact, and the axially extending legs of the load rings are compressed to impart rotation of the rotating parts to the seal rings.

Sealing structures in some ways similar to those disclosed by this invention are shown in U.S. Patent Number 1,862,887 to Durdin and U.S. Patent Number 3,073,689 to Kupfert et al. One of the main distinctions of the present invention over the sealing structure disclosed by Durdin pertain to the shape of the rigid seal rings. In Durdin the seal rings are generally L-shaped in radial cross section and the associated rubber load rings are generally rectangular in cross section. In the Durdin construction the load rings are effective to urge the radial faces of the seal rings in contact and thus provide a seal. Since Durdin teaches that the contacting faces of the metal rings are ground flat, a large annular area of contact is produced. This is susceptible to galling and fretting because of the variation of linear velocity across the seal faces and also because of the difficulty in lubricating the faces.

Installation of the seals disclosed by Durdin must be performed with care in order to prevent excessive compression of the rubber rings. At the same time, sufficient force is required to maintain the confronting contacting seal faces in engagement in order to produce an effective seal. If for any reason a compressive force is produced which is greater than that required to maintain an effective seal, the seal rings are deflected so that each contacting face assumes a generally concave configuration with respect to the seal face of the opposite ring. Under these conditions an effective seal would be lost.

Of greater pertinence to the present invention is the seal shown and described in the Kupfert et al. patent. The design of Kupfert et al. seals introduce several complexities which not only substantially increases the cost of the seals but also restricts the use of such seals to places where a relatively large space is available. The resilient rubber-like toric members shown by Kupfert et al. are associated with converging tapered surfaces formed on the seal ring and the parts desired to be sealed. The tapered surfaces cooperate to hold the rubber tori in compression and the force of such compression is transferred to seal rings which are distorted to position the seal bands for face-to-face contact.

The present invention, by making the seal rings square or rectangular in radial cross section, while supporting each ring by an L-shaped load member, not only produces a seal ring which is economical to manufacture and not subject to distortion but also one which finds use in a greater variety of environments where space is at a premium. The present invention also locates the seal band inward of the outer diameter of the ring at the apex of recessed surfaces which taper away from the seal plane at very slight angles. The location of the seal band and the manner in which recessed surfaces taper from the seal band minimize problems of loss of sealing contact due to eccentricity. It is an important object of this invention to so construct the seal rings that this result can be obtained without flexure of the seal rings.

It is another object of this invention to provide a new and improved sealing device which has particular application for use as a track link seal in a sealed track.

Another object of this invention is to maintain the seal rings in contact under pressure without causing distortion thereof.

Another object of this invention is to provide a sealing device of the character described which will occupy a very small amount of space.

The axially extending legs of the L-shaped load ring may be associated with the other components of the seal installation in a way that permits the axially extending legs to prevent abrasive material from contacting the radially extending legs of the L-shaped load member. This prevents abrasion of the radially extending legs and permits a constant load to be applied to the seal rings, and this is a further object of the present invention.

Further and more specific objects and advantages of the present invention and the manner in which it is carried into practice are made more apparent in the following specification wherein the invention is described in detail by reference to the accompanying drawings.

Figure 5:
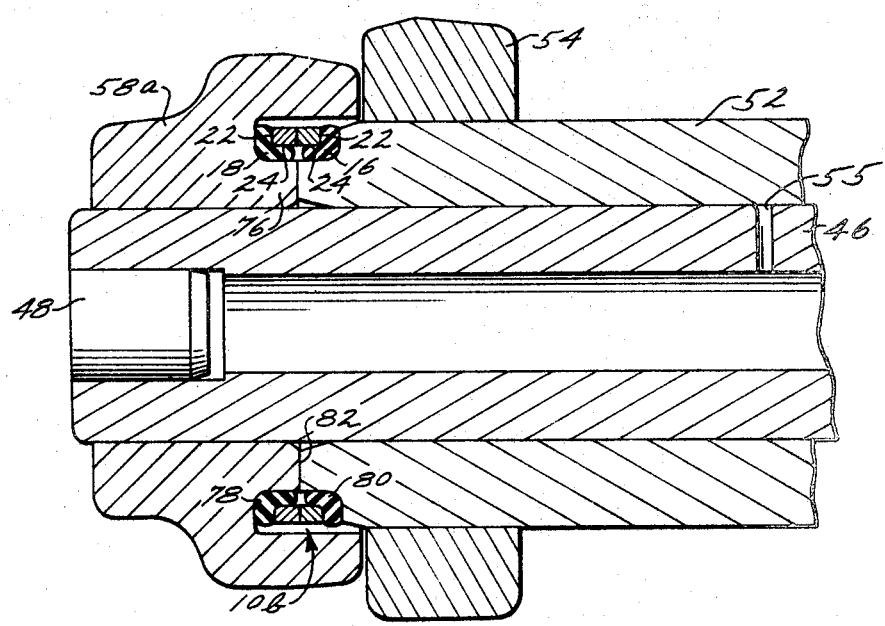
Figure 6:
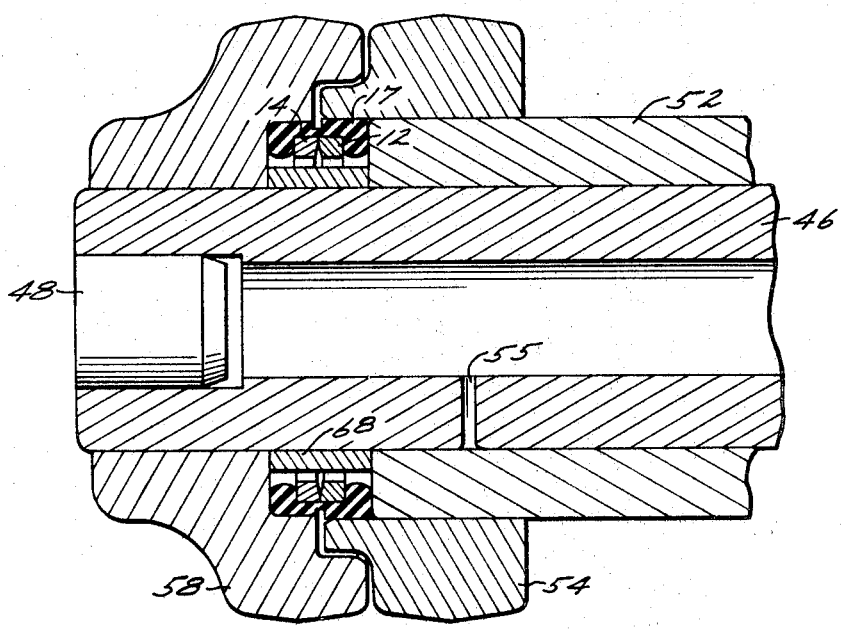

In the drawings:
FIG. 1 is a perspective view of the seal constructed in accordance with one embodiment of this invention;
FIG. 2 is an enlarged radial section view of the seal shown in FIG. 1;
FIG. 2a is an enlarged fragmentary view illustrating the inner and outer relieved portions of the seal rings shown in FIG. 2;
FIG. 3 is an enlarged fragmentary longitudinal section view showing the seal of FIG. 1 arranged between relatively rotating members;
FIG. 4 is a fragmentary longitudinal section view of a track-hinge connection for a sealed track incorporating one embodiment of the seal of this invention;
FIG. 5 is a view similar to FIG. 4 showing a modified form of the seal and the hinge connection; and
FIG. 6 is a view similar to FIG. 4 showing another form of seal and hinge connection.

The sealing device of this invention is generally indicated by the numeral 10 in FIG. 1. It includes a symmetrical pair of rigid annular seal rings 12 and 14 preferably made of a suitable wear and corrosion resistant metal alloy such as "Stellite 93." Elastomeric, generally L-shaped in cross section, load rings 16 and 18 are formed to overlie respective peripheral surfaces of each of the seal rings. These load rings can be formed of a synthetic, highly oil resistant rubber. Buna N rubber having a 60 durometer hardness has been found quite satisfactory. When the seal 10 is seated in a suitable cavity between relatively rotating members the load rings 16 and 18 are effective to load the seal rings axially to prevent dirt from passing between the seal faces and to load the seal rings radially to transmit rotation of the relatively rotating parts to the seal rings.

Referring now to FIG. 2, which shows an enlarged radial section of the sealing device, it will be noted that each of the seal rings 12 and 14 is substantially rectangular in cross section and defines outer circumferential surfaces 20, annular radial surfaces 22, inner circumferential surfaces 24, and confronting surfaces 26 which are formed to define seal bands 28 in a manner hereinafter more particularly described.

The load rings 16 and 18 include circumferential leg portions 30 radially adjacent the surfaces 20 and radial portions 32 axially adjacent the surfaces 22. The load rings, when compressed in a manner to be described in detail below, are effective to urge the seal bands 28 toward each other. The load rings torsionally drive the seal rings 12 and 14 relative to each other. The load rings serve to cushion the metal rings and thus serve to prevent distortion of the seal rings as a result of shifting of other parts of the seal assembly. The load rings also locate the seal bands for mutual engagement, and provide an effective and durable, static back seal to prevent entry of foreign matter around or behind the seal bands.

The confronting surfaces 26 are formed with a slight concave curvature inwardly of the seal band to define a radially outwardly converging passageway 34. The concave surface portions 36, extending from the inner circumferential surface 24 to the seal band 28, are formed with a radius of curvature of approximately 80 inches. By providing the passageway 34 lubricant is readily supplied to the seal band 28, and the seal band can also regenerate inwardly. The slight concave curvature and relief from a perfectly flat seal face across the entire radial extent of the ring also develop stable and effective sealing contact in a manner to be described in greater detail below.

To prevent problems of fretting and galling, which is prevalent in seals having a large annular contact area such as shown in the Durdin patent, the seal band 28 of the present invention is made relatively narrow in width. The width of the seal band may be from .030 to .060 inch. The portions of confronting faces 26 radially outwardly from the seal band 28 are formed with recessed surfaces 37 so as to taper away from flatness by a slight amount. This produces a slight gap 38. Each surface 37 may preferably be made convex to within 5 to 25 light bands of perfect flatness. One light band in this case is about 10 microinches. This produces a gap 38 of 0.0001 to 0.0005 inch. The gap 38 is a very minute space not visible to the naked eye. A primary purpose of the recessed surface 37 is to position the seal band approximately midway between the inner and outer peripheries at the juncture of the recessed surfaces 36 and 37. This construction provides an effective seal band of the desired width, and the angle of taper of the surfaces 36 and 37 is slight enough that effective sealing contact is maintained during eccentric movement of the seal rings. The gap 38 is also sufficiently small to prevent entrance of large particles of foreign material to the seal band area 28.

FIG. 3 shows two relatively rotating members 40 and 42 which are provided with counterbores 44 for receiving the load rings 16 and 18 and the associated seal rings 12 and 14. The shape of the load rings prior to their insertion into the counterbores 44 is shown in phantom outline. It will be apparent that upon insertion of the load and seal rings in the counterbores, the load rings are compressed axially and circumferentially causing deformation to the approximate shape shown by full lines in FIG. 3.

It has been found that compression of the circumferential leg portions 30 approximately 10 percent is sufficient to transfer rotation of the members 40 or 42 to the seal rings 12 and 14.

Axial compression of the leg portions 32 in the order of 25 percent engages the seal bands with a face load of about 280 pounds. This size of face load is desirable in the case of a track pin seal. The high load prevents dirt from passing between the seal faces, and the high load can be used because of the low rate of rotation in the track pin seal.

If the seal of the present invention is to be used in a situation where there is continuous rotary motion of relative high speeds, the axial load should be considerably less.

The extent of the axial load can be controlled by limiting the extent to which the legs 32 are compressed.

Abrasives which may enter the passageway 45 between the rotating members 40 and 42 are prevented from entering the bearing cavity by the contacting seal bands 28 and the circumferential leg portions 30.

Experiments conducted under very adverse conditions wherein a large quantity of abrasive material infiltrated through the passageway 45 revealed that the gap 38 was sufficiently narrow to prevent the passage of such abrasive material to the seal bands 28. However, the abrasive material can cause erosion and wear of the circumferential leg portions 30. In tests some wear of legs 30 had occurred after 450 hours of operation. But the rate of wear of the leg portions 30 was of such a low value that it is estimated that the leg portions 30 should fulfill their driving and sealing function for a period of time greatly in excess of the 450 hours.

When the load rings are installed as described above, the legs 30 also prevent any wear of legs 32 so long as the legs 32 are sufficiently intact to extend entirely across the space between parts 40 and 42 and the opposed surfaces 20 of the seal rings. This prevents wear of legs 32 and permits legs 32 to exert a constant axial load.

Use of the sealing device 10 in a sealed track mechanism of the type used in track-type tractors is shown in FIG. 4. In the fragmentary sectional view there is shown a tubular track pin 46 whose bore 46a is closed at the opposite ends thereof by plugs 48 located in counterbores 50. A tubular track bushing 52 is rotatably mounted on the pin 46.

Lubricant, which is deposited in the bore 46a of the track pin, is distributed to the adjacent surfaces of the bushing 52 and the track pin 46 by a small passageway 55.

As is conventional in the art, each of the crawler chains for a tractor comprises a plurality of pins and bushings which are interconnected by a series of links resulting in a continuous chain. Only a portion of such links is shown in cross section in FIG. 4. An inner link 54 is press-fitted on the bushing 52, and an outer link 58 is press-fitted on the pin 46. On pivotal movement of the links about the axis of pin 46, the bushing 52 rotates relative to the pin 46. The link 58 is formed with concentric counterbores 62 and 64 within which are disposed, respectively, the end of the bushing 52 and a portion of the seal 10. The ends of the bushing 52 are also counterbored as at 66 to receive the remaining half of the seal 10.

Before the outer link 58 is press-fitted on the pin 46, a spacer sleeve 68 is fitted on the pin 46. The sleeve 68 serves the purpose of maintaining a predetermined axial spacing of the radial walls of the counterbores 64 and 66.

The counterbore 62 is of sufficient dimension to define a clearance passageway 70 leading to the cavity formed by the counterbores 64 and 66.

As shown in FIG. 4, the outer link 58 and the inner link 54 are assembled with the annular surface 72 of the link 58 being slightly spaced from the surface 74 of the inner link 54 in order to limit the size of the abrasive particles which will migrate to the counterbores 64 and 66 through the clearance passageway 70.

The sleeve 68 is made of a particular length in order to establish a predetermined axial distance between the radial walls of the counterbores 64 and 66 so that when the seal 10 is assembled, the compression applied by the load rings 16 and 18 to the seal rings 12 and 14 is in the order of 240 or 280 pounds.

In addition the diameters of the counterbores 64 and 66 are smaller than the outer diameter of the load rings when they are in their free state so that on rotation of the outer link 58 and the pin 46 relative to the inner link 54 and the bushing 52 the seal rings 12 and 14 are caused to rotate relative to each other.

As mentioned previously, the abrasive material which comes in contact with the circumferential walls 30 of the load rings can have the effect of wearing away these walls. But it has been found that the seal will maintain its sealing function even though a substantial portion of the circumferential wall 30 is worn away.

FIG. 5 also shows a crawler-link connection incorporating the seal of this invention and is substantially similar to that shown in FIG. 4 with the exception that the outer link 58a is formed with an inwardly extending boss portion 76 for contacting the end of the track bushing 52. By this construction, use of the spacer sleeve 68 is obviated.

In addition it is to be observed that the load rings 16 and 18 of the seal 10b are made to contact the outer annular radial surfaces 22 and the inner circumferential surfaces 24 of the respective seal rings.

The predetermined amount of axial compression applied to the load rings 16 and 18 is achieved by spacing the radial surfaces substantially the same distance from the plane of contact 82 of the bushing 52 and the other link 58a. The total axial distance between the surfaces 78 and 80 is equal to the desired axial compression of the load rings.

The tractor chain incorporating the sealing device in accordance with FIG. 5 is somewhat cheaper to manufacture than the embodiment of FIG. 4.

By making the seal rings 12 and 14 substantially rectangular in shape and urging them in contact by an evenly distributed force, such as provided by the load rings 16 and 18 acting on the surfaces opposite the seal bands 28, deflection of the seal rings and the seal bands is prevented. The square cross section of the rings 12 and 14 provides rigidity. The resilient load rings provide a flexible support for the seal rings. These resilient load rings cushion the seal ring and permit the end of the track pin to shift with respect to the end of the bushing as the track tension varies. Such shifting is compensated for by the resilient load rings, and the seal faces are maintained in sealing contact and are effective to prevent dirt from passing through the seal faces.

Another form of track pin and bushing for a sealed track is shown in FIG. 6. In this figure, as in FIGS. 4 and 5, the seal for only one end of the track pin is shown. The other end of the track pin will have a similar seal, as will every other hinge in the entire track. Thus, the entire track will be sealed.

The construction shown in FIG. 6 is generally like that shown in FIGS. 4 and 5 but contains the following specific points of difference.

The annular extension needed for supporting the inner resilient load ring has been integrated with the link 54. This eliminates the need to counterbore the bushing 52. Since the track pins and bushings have the highest rate of wear, it is economically desirable to eliminate all possible machining operations on these parts to thereby keep their cost at a minimum. Forming the annular extension on the track link 54 also permits the use of a slightly larger diameter seal to provide greater freedom for seal design and assembly.

In the FIG. 6 construction also the elastomeric load member has been made as a single grooved load ring 17. The use of a one-piece rubber load ring serves as an assembly aid and also provides an arrangement which is more readily packaged as a unit prior to initial assembly.

In the arrangement shown in FIG. 6 two lube ports are formed in the pin with one port located close to each high load area while only a single centrally located port is used in FIGS. 4 and 5.

Thus, the present invention provides a stable seal which is effective over a long operational life. The stability of the seal is achieved in part by the narrow width of the seal band, which avoids problems of fretting and galling, and in part by the location of the seal band between the inner and outer peripheries of the ring. This location makes initial radial alignment less critical. The stability of the seal is also enhanced by the manner in which the outer peripheral area of the seal face is tapered away from the seal plane. Recessing this area of the seal face away from the seal plane not only contributes to maintaining a narrow width seal band but also aids stability by maintaining sealing engagement during eccentric movement of the seal ring. The taper is so slight that the seal band can shift radially onto the relieved area during any eccentric movement to an extent sufficient to maintain the sealing contact.

The seal ring is shaped and is supported in a manner to prevent any flexure of the ring and seal band.

The stability of the seal is thus a result of a combination of location, configuration, rigidity and support. The location is inwardly from the outer edge of the ring. The configuration is the apex of two very slightly tapered surfaces. The cross section of the ring is designed for maximum rigidity. And the ring is supported in a manner to avoid transmission of any forces which could stress the ring beyond the rigidity provided by the ring shape.

Moreover, the stable long-lived seal of the present invention is accomplished by the use of very simple structure which requires a minimum of installed space.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A face seal comprising, a symmetrical pair of seal rings of hard material, each seal ring having a seal face which includes a narrow width seal band located intermediate the inner and outer peripheries of the ring, an inner relieved area which tapers from an area of maximum recess at the inner periphery of the seal ring to junction with the inner boundary of the seal band, and an outer relieved area which tapers from an area of maximum recess at the outer periphery of the seal ring to junction with the outer boundary of the seal band, the angle of taper of the outer relieved area being sufficiently small to permit some radial shifting of the seal band to maintain fluid sealing contact on eccentric movement of the seal rings and also to maintain the gap between the opposed outer relieved areas of the two seal rings sufficiently small to keep substantially all abrasive particles out of the gap and away from the seal band, said seal rings having rectangular cross sections sufficiently rigid to resist all flexure of the seal bands under the loads developed when the rings are installed in a seal assembly, and elastomeric load means for engaging the seal rings on two adjacent peripheral surfaces and effective to apply substantially uniform distributed loads to the rings while cushioning the rings against distortion as a result of movement of other components of the seal assembly.

2. A face seal as defined in claim 1 wherein the elastomeric load means are L-shaped load means for engaging the seal ring on two adjacent peripheral surfaces and are effective to apply substantially uniformly distributed loads to the peripheral surfaces while cushioning the ring against distortion as a result of movement of other components of the seal assembly.

3. A track pin and bushing seal for a sealed track comprising, bushing and link means providing opposed side and cylindrical walls adjacent an end of the bushing, spacer means for maintaining the side walls at a selected spacing, L-shaped elastomeric load means engaged in sealing relation with said walls and compressed by said walls, and a symmetrical pair of seal rings of hard material carried within the L-shaped load means with radially and axially extending legs of the load means engaged in sealing relation with associated peripheral surfaces of each seal ring, said seal rings having substantially square shaped cross sections which prevent flexure and having seal faces formed with narrow width seal bands disposed intermediate the inner and outer peripheries of the rings and at the apex of inner and outer recessed surfaces tapering away from the seal plane toward the respective inner and outer peripheries.

4. A sealing device comprising, a pair of rigid seal rings having substantially rectangular cross sections, one annular surface of each seal ring being formed to define a narrow seal band located intermediate the inner and outer peripheries thereof at the apex of oppositely tapered inner and outer surfaces, and an elastomeric load ring for each seal ring having integral radial and circumferential wall portions adapted to overlie the adjacent radial and circumferential surfaces of said seal rings, said load rings being effective to produce oppositely directed axial forces holding said seal rings in forceable engagement in order to maintain said seal bands in intimate contact, and such axial forces on each ring producing a resultant having a line of action located at approximately the same radial distance from the central axis of said seal rings as the distance of the seal band.

5. A track pin and bushing seal as defined in claim 3 wherein the width of the gap between the outer tapered surfaces is in the order of 0.0001 to 0.0005 inch at the outer periphery.

References Cited
UNITED STATES PATENTS

| | | | |
|---|---|---|---|
| 2,296,724 | 9/1942 | McCormack | 277—92 X |
| 3,024,048 | 3/1962 | Kobert | 277—38 X |
| 3,031,199 | 4/1962 | Laser et al. | 277—92 X |
| 3,073,689 | 1/1963 | Kupfert et al. | |

OTHER REFERENCES

Construction Methods, vol. 41, No. 9, p. 53, September 1959.

LAVERNE D. GEIGER, *Primary Examiner.*

J. MEDNICK, *Assistant Examiner.*